United States Patent Office 3,787,589
Patented Jan. 22, 1974

---

3,787,589
PROCESS FOR PREPARING CARROT JUICE
Thomas S. Stephens, Weslaco, Guadalupe Saldana, McAllen, and Harold E. Brown, Weslaco, Tex., assignors to the United States of America as represented by the Secretary of Agriculture
No Drawing. Filed Oct. 12, 1972, Ser. No. 297,123
Int. Cl. A23l 1/02, 3/34
U.S. Cl. 426—325                                 3 Claims

---

ABSTRACT OF THE DISCLOSURE

An improved process for preparing carrot juice which process incorporates a process step of cooking in an acidic aqueous solution the whole carrots immediately prior to juice extraction.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has as its object the provision of a novel process for preparing carrot juice in such a manner as to avoid the formation of a coagulum upon further processing.

Several different process modifications of vegetable juice extraction and of preservation are practiced in the manufacture of carrot juice. Some start with washed raw (peeled or unpeeled), blanched (water or steam), or cooked carrots. Some extract juice from whole carrots by means of an hydraulic press; others pass the carrots through a hammermill, other type comminutor, or an homogenizer, prior to separation of the juice and fiber by means of presses, finishers, screens, centrifuges or other items of liquid-solid separation equipment to give maximum yield of a juice with body (density), smooth creamy mouth-feel, and characteristic carrot flavor. Heretofore in the case of all the prior art processes, a problem arises if juice extracted from fresh raw carrots is heated to about 180° F. before or during conventional canning practices. An unsightly, unappetizing coagulum forms. Canning practices typically involve heating the separated juice in a heat-exchanger, or exhausting the juice in the container, followed by retorting for periods of from 22 minutes to 30 minutes at temperatures of from 240° F. to 250° F. Time and temperature combinations are determined by such variables as the initial temperature of the preheated juice, can size, and juice acidity. Acidification of carrot juice allows some reduction in sterilization time and temperature or both. Regardless of whether the freshly extracted juice is acidified within palatability ranges, neutralized, or homogenized, a coagulum forms in the processed product after it has been exposed to conventional canning temperatures. This coagulum limits the market acceptance of canned carrot juice and deprives the vegetable processing industry of a profitable outlet for utilizing surplus and edible cull carrots.

It is the object of this invention to provide a process for the preparation of carrot juice having improved properties.

In accordance with the present invention, a revised pretreatment procedure is employed. The new pretreatment procedure when applied as described herein permits the extraction of juice by conventional methods and yields a juice in which suspended solids are homogeneously distributed. A particularly unusual and highly desirable result that stems from the application of the pretreatment procedure, which is the basis of this invention, is that a carrot juice is produced in which a coagulum will not form when the juice is further subjected to the conventional pasteurization and canning temperatures used for vegetable juice preservation.

In general, the process of the invention for the preparation of carrot juice having improved properties involves:

(1) Submerging washed whole carrots in an .05 N to .1 N solution of a food grade acid such as acetic, citric, fumaric, malic, lactic, succinic, phosphoric or hydrochloric at boiling temperature. The normality required of any selected acid will be that normality required to yield an extracted juice with a pH within the range 5.5 to 5.3. It is recognized that a lower pH may be used but results with acidities above pH 5.6 tend to be erratic. It is important that whole carrots be treated in this step and not cut, chopped, or ground carrots since as we shall show later on, the acid treatment of chopped or ground material causes the carotene or color constituents to remain in the exhausted pulp and not pass on into the extracted carrot juice. Chopping or grinding prior to the recommended acid treatment adversely affects both juice color and juice yield.

(2) Cooking the carrots in the acidified boiling cover medium (i.e., the carrots were submerged in one medium) for approximately 5 minutes. Time intervals can vary slightly depending on the size of the carrots. However, optimum time intervals for yield and for prevention of the formation of a coagulum can easily be determined by preliminary tests.

Other steps in the overall process involves washing, grading selection, extraction and canning treatments and follow those practiced in the industry. The acidified extracted carrot juice may be neutralized before further processing depending upon contemplated end use and taste preferences.

Example 1 which follows describes a conventional prior art process for the production of carrot juice and records the unsatisfactory characteristics of the resultant juice.

Example 2 also describes a conventional prior art process for the production of carrot juice. The process of Example 2 differs from the process of Example 1 in that the carrots are cooked prior to grinding and pressing in process of Example 2. The resultant juice from the process described in Example 2 is unsatisfactory as the recorded characteristics show.

Example 3 demonstrates the process that is the subject of this invention.

Example 4 represents a prior art process operated according to the procedure of Example 1 except that in Example 4 the carrots were cooked for varying time intervals. Note that the critical acidulation treatment is lacking in this example and that the juice characteristics in all cases were unsatisfactory.

Example 5 again demonstrates the process that is the subject of this invention. Time intervals for cooking is the only variable among the several experimental runs.

Example 6 is incorporated in order to show the extraordinary effect that grinding of the material prior to cooking can exert on the carotene content of the juice. Prior grinding (i.e., grinding the material before the cooking step) causes a substantial portion of the total carotene to remain in the pulp or press cake and permits very little carotene to carry over into the juice.

EXAMPLE 1

Approximately 25 pounds of washed, trimmed, unpeeled Imperator variety raw carrots were ground in a Fitzpatrick comminuting machine fitted with a .064 inch screen. The ground carrot macerate was weighed, then pressed in a Palmer rack and cloth press at a pressure of 6000 p.s.i. After reaching 6000 p.s.i., the pressure was held on the cake for 15 minutes. The extracted juice was weighed and the percentage juice calculated. Juice yields for the Imperator variety carrot ranged in 8 tests from 67.8% to 74.0%. The juice was heated to 180° F., filled into 303 x 406 enameled cans, sealed and processed 30 minutes at 240° F. The cans were opened and analysis made for percent light transmitted through the juice, Brix, pH, titratable acidity and color. The results are shown in the following table.

TABLE I.—JUICE FROM RAW CARROTS

| Sample number | Percent | | | | | Color | | |
|---|---|---|---|---|---|---|---|---|
| | Juice yield | Light trans. | Brix | pH | Acid, percent | Rd | a | b |
| 1 | 74.0 | 95 | 7.2 | 6.1 | .07 | 3.3 | −3.0 | 7.5 |
| 2 | 73.7 | 98 | 6.0 | 6.3 | .05 | | | |
| 3 | 67.8 | 100 | 7.0 | 6.2 | .06 | 2.9 | −6.6 | 9.2 |
| 4 | 68.5 | 99 | 8.3 | 6.1 | .06 | 1.1 | −2.8 | 3.6 |
| 5 | 72.4 | 95 | 7.7 | 6.3 | .10 | 1.4 | −2.1 | 3.6 |
| 6 | 69.6 | 98 | 9.6 | 5.9 | .11 | 1.2 | −5.5 | 4.6 |
| 7 | 71.5 | 96 | 9.4 | 6.0 | .10 | .7 | −3.3 | 2.3 |
| 8 | 71.4 | 95 | 9.2 | 6.0 | .10 | 1.0 | −2.2 | 2.0 |

All juice samples curdled (formed a coagulum) when subjected to processing temperatures. The coagulum, containing the orange color of the juice, settled to the bottom of the can, resulting in a very poorly colored juice. The percent light transmission through the juice varied from 95 to 100% transmission. The pH varied from 5.9 to 6.3.

EXAMPLE 2

The procedure of Example 1 was repeated with these changes:
(1) The Imperator carrots were covered with (submerged in) approximately 8 gallons of boiling water and different batches were cooked at 212° F. for 5 minutes.
(2) The water was drained from the carrots.
Juice yields ranged in 9 tests from 60.2% to 72.7%.
The results of the analysis of the canned juice are presented in Table II.

TABLE II.—JUICE FROM CARROTS COOKED 5 MINUTES IN WATER

| Sample number | Percent | | | | | Color | | |
|---|---|---|---|---|---|---|---|---|
| | Juice yield | Light trans. | Brix | pH | Acid, percent | Rd | a | b |
| 1 | 71.3 | 59 | 7.2 | 5.7 | .07 | 18.3 | 17.8 | 29.5 |
| 2 | 60.2 | 52 | 7.0 | 5.7 | .06 | 21.9 | 25.4 | 32.5 |
| 3 | 69.3 | 56 | 8.5 | 5.9 | .12 | 16.5 | 19.0 | 29.7 |
| 4 | 68.9 | 56 | 8.4 | 5.6 | .11 | 17.2 | 19.4 | 30.4 |
| 5 | 69.8 | 52 | 8.4 | 5.7 | .10 | 18.5 | 20.9 | 31.4 |
| 6 | 72.7 | 44 | 8.3 | 5.8 | .12 | 19.5 | 27.5 | 21.9 |
| 7 | 67.2 | 44 | 9.6 | 5.9 | .13 | 20.9 | 29.7 | 33.5 |
| 8 | 68.2 | 47 | 9.6 | 5.7 | .13 | 19.2 | 28.3 | 32.0 |
| 9 | 68.0 | 42 | 9.8 | 5.6 | .12 | 21.1 | 28.1 | 32.0 |

A light coagulum formed in all samples of juice. The amount of the coagulum was not as much as was formed in the juice prepared from raw carrots. The light transmission through the juice varied from 42 to 59 percent and the juice had a deeper orange color than juice prepared from raw carrots. The pH varied from 5.6 to 5.9.

EXAMPLE 3

The procedure of this example represents the process which is the subject of this invention.
Whole Imperator carrots were covered with (submerged in) approximately 8 gallons of a .05 N acetic acid solution and different batches were cooked at 212° F. for 5 minutes.
The acid solution was drained from the carrots.
Juice yields ranged in 9 tests from 69.3% to 75.8%.
The results of the analysis of the canned juice are presented in Table III.

TABLE III.—JUICE FROM CARROTS COOKED 5 MINUTES IN .05 N ACETIC ACID

| Sample number | Percent | | | | | Color | | |
|---|---|---|---|---|---|---|---|---|
| | Juice yield | Light trans. | Brix | pH | Acid, percent | Rd | a | b |
| 1 | 69.8 | 33 | 8.0 | 5.4 | .11 | 25.5 | 36.2 | 34.9 |
| 2 | 66.9 | 31 | 10.4 | 5.3 | .13 | 25.1 | 33.7 | 35.2 |
| 3 | 72.2 | 33 | 9.0 | 5.4 | .16 | 23.3 | 27.8 | 34.9 |
| 4 | 72.1 | 35 | 8.6 | 5.4 | .16 | 23.4 | 27.3 | 35.0 |
| 5 | 74.2 | 39 | 8.6 | 5.4 | .16 | 23.2 | 25.3 | 34.7 |
| 6 | 75.8 | 43 | 8.4 | 5.5 | .15 | 23.1 | 29.3 | 34.6 |
| 7 | 69.3 | 33 | 9.6 | 5.5 | .16 | 22.7 | 31.7 | 34.7 |
| 8 | 71.9 | 31 | 9.7 | 5.3 | .16 | 24.0 | 31.8 | 34.6 |
| 9 | 72.9 | 38 | 9.4 | 5.4 | .15 | 23.3 | 30.9 | 34.5 |

A coagulum did not form in any of the juice samples extracted from carrots which had been heated in an acidified medium. The percentage light which could be transmitted through the juice varied from 31 to 43 percent. The color of the juice was brighter orange than the color of the juice extracted from carrots cooked 5 minutes in water. The pH of the juice varied from 5.3 to 5.5. The flavor of the juice was rated excellent and was in no way damaged by the acid cooking treatment.

EXAMPLE 4

The procedure of Example 1 was repeated with these changes:
(1) The Imperator carrots were covered with (submerged in) approximately 8 gallons of boiling water and different batches were cooked for 1, 5, 15, and 25 minutes.
(2) The water was drained from the carrots.
Juice yields ranged from 48.9% to 74.0%. The results of the analysis of the canned juice are presented in Table IV.

TABLE IV.—JUICE FROM CARROTS COOKED 1, 5, 15 AND 25 MINUTES IN WATER

| | Juice yield | Light trans. | Brix | pH | Acid | Color | | |
|---|---|---|---|---|---|---|---|---|
| | | | | | | Rd | a | b |
| Raw | 74.0 | 95 | 7.2 | 6.1 | .07 | 3.3 | −3.0 | 7.5 |
| Min. cooked: | | | | | | | | |
| 1 | 74.7 | 94 | 8.0 | 6.0 | .12 | 2.5 | −2.3 | 6.6 |
| 5 | 71.3 | 59 | 7.2 | 5.7 | .07 | 18.3 | 17.8 | 29.5 |
| 15 | 52.4 | 67 | 7.5 | 5.4 | .09 | 16.2 | 12.5 | 28.9 |
| 25 | 48.9 | 74 | 7.0 | 5.3 | .09 | 14.6 | 10.3 | 27.8 |

A very pronounced curdle (coagulum) formed in the juice prepared from raw carrots and carrots cooked 1 minute. A light coagulum formed in the other samples. Juice could not be efficiently extracted from carrots cooked 15 and 25 minutes by the process used, demonstrated by the fact that the yield dropped to 52.4% and 48.9%, respectively.

Cooking the carrots for 15 and 25 minutes in water damaged the color of the extracted juice.

EXAMPLE 5

The procedure of this example represents the process which is the subject of this invention. Time intervals for cooking is the only variable.

Whole Imperator carrots were covered with (submerged in) approximately 8 gallons of .05 N acetic acid solution and different batches were cooked at 212° F. for 1, 3, 5, and 15 minutes.

The acid solution was drained from the carrots.

The juice yield ranged from 54.7% to 74.0%. The results of the analysis of the canned juice are presented in Table V.

TABLE V.—JUICE FROM CARROTS COOKED 1, 3, 5, AND 15 MINUTES IN .05 N ACETIC ACID

| | Juice yield | Light trans. | Brix | pH | Acid | Color | | |
|---|---|---|---|---|---|---|---|---|
| | | | | | | Rd | a | b |
| Raw | 74.0 | 95 | 8.6 | 6.1 | .10 | 1.1 | -2.1 | 5.4 |
| Min. cooked: | | | | | | | | |
| 1 | 78.6 | 94 | 8.0 | 5.7 | .13 | 3.6 | -2.5 | 9.4 |
| 3 | 75.4 | 32 | 8.6 | 5.5 | .12 | 21.1 | 28.3 | 33.0 |
| 5 | 69.4 | 31 | 8.5 | 5.3 | .13 | 25.1 | 33.7 | 35.2 |
| 15 | 54.7 | 36 | 8.2 | 5.1 | .17 | 25.6 | 24.0 | 36.4 |

A very pronounced curdle (coagulum) formed in the juice prepared from raw carrots and carrots cooked 1 minute. A coagulum did not form in juice prepared from carrots cooked 3, 5, or 15 minutes. Cooking carrots in an acid medium for 15 minutes caused a reduction in yield of juice, but the color of the extracted juice was not damaged.

The examples illustrate the application and control of time, temperature, heat, acidity, and mechanical variables to attain an objective as practiced in the science of food technology.

EXAMPLE 6

A 25 pound lot of carrots was used. Thirty liters of a .05 N acetic acid solution was heated to boiling. The 25 pound lot of whole carrots was heated for 5 minutes in the acid solution, then ground in a Fitzpatrick mill fitted with a .064 mesh screen and the juice extracted in a rack and cloth type press operated at a pressure of 6000 p.s.i.g. for 15 minutes. The extracted juice was heated to 180° F. filled hot into golden enamel No. 303 cans, and processed at 10 pounds pressure (240° F.) for 30 minutes and cooled in tap water.

|  | Lbs. |
|---|---|
| Whole carrots | 25.0000 |
| After grinding | 23.8125 |
| Lost in mill | 1.1875 |
| Juice extracted | 17.0625 |

Percentage juice extracted, 71.7.
pH, 5.35.

The sample of juice prepared by the same procedure except that the carrots were ground prior to the cooking step. Ten pounds of the washed carrots were ground in the Fitzpatrick mill fitted with a .064 mesh screen. The ground carrot pulp had a pH of 6.10. A solution of acetic acid prepared by mixing .5 ml. of glacial acetic acid with 100 ml. of water was sprinkled over the ground carrots with constant mixing. The pH was lowered to 6.0. Additional glacial acetic acid was then added to the ground carrots with constant stirring until 10 ml. had been added. The pH of the ground carrots was lowered to 4.84. The acidified ground carrots were heated to 180° F. as rapidly as possible and the juice extracted.

|  | Lbs. |
|---|---|
| Whole carrots | 10.0000 |
| After grinding | 9.3750 |
| Juice extracted | 6.6875 |

Percentage juice extracted, 71.3.
pH, 4.84.

In neither case did the extracted juice curdle (form a coagulum) during processing but the carotene content of the juice from the preground carrots was markedly reduced.

The above described runs were repeated on two different occasions with substantially the same yield results.

Recorded below are the carotene analyses.

|  | Run No. 1, mg. of carotene/100 ml. | Run No. 2, mg. of carotene/100 ml. |
|---|---|---|
| Whole carrots cooked: | | |
| Canned juice | 6.00 | 4.69 |
| Press cake | 10.01 | 14.60 |
| Ground carrots cooked: | | |
| Canned juice | 0.32 | 0.33 |
| Press cake | 27.10 | 24.24 |

Juice prepared by process wherein the material was ground prior to cooking in each instance had a light green color that would not be acceptable as a canned carrot juice. Moreover, note that this juice contained 12 to 14 fold lesser amount of carotene than did the juice from the process in which the carrots were cooked whole.

We claim:

1. A process for the preparation of carrot juice comprising:
   (a) submerging whole raw carrots in a boiling .05 N to .10 N aqueous solution of a food grade acid, said normality of the acid solution yielding a pH of about from 5.3 to 5.5 in the subsequently extracted carrot juice;
   (b) cooking the submerged whole carrots in the said boiling aqueous solution for about from 3 to 15 minutes at the boiling temperature;
   (c) draining the acid solution from the cooked whole carrots;
   (d) grinding the cooked and drained whole carrots;
   (e) extracting the juice from the ground cooked carrots;
   (f) heating the extracted juice to 180° F. and filling it into containers;
   (g) sealing the juice-filled cans; the thus processed carrot juice showing no evidence of curdling, as evidenced by the formation of a coagulum, when the sealed can containing carrot juice is heated for 30 minutes at a temperature of 240° F. and then opened.

2. A process for the preparation of carrot juice comprising:
(a) submerging whole raw carrots in a boiling .05 N to .10 N aqueous solution of a food grade acid selected from the group consisting of acetic, citric, fumaric, malic, succinic, phosphoric and hydrochloric acids, said normality of the acid solution yielding a pH of about from 5.3 to 5.5 in the subsequently extracted carrot juice;
(b) cooking the submerged whole carrots in the said boiling aqueous solution for about from 3 to 15 minutes at the boiling temperature;
(c) draining the acid solution from the cooked whole carrots;
(d) grinding the cooked and drained whole carrots;
(e) extracting the juice from the ground cooked carrots;
(f) heating the extracted juice to 180° F. and filling it into containers;
(g) sealing the juice-filled cans; the thus processed carrot juice showing no evidence of curdling, as evidenced by the formation of a coagulum, when the sealed can containing carrot juice is heated for 30 minutes at a temperature of 240° F. and then opened.

3. The process of claim 2 wherein the food grade acid is acetic acid.

References Cited
UNITED STATES PATENTS

| | | | |
|---|---|---|---|
| 2,419,545 | 4/1947 | Gray et al. | 99—105 |
| 2,522,535 | 9/1950 | Pryor | 99—103 X |
| 2,780,551 | 2/1957 | Guadagni | 99—100 X |
| 3,454,406 | 7/1969 | Alderton | 99—215 |

FOREIGN PATENTS

| | | | |
|---|---|---|---|
| 497,571 | 11/1953 | Canada | 99—103 |

NORMAN YUDKOFF, Primary Examiner

K. P. VAN WYCK, Assistant Examiner

U.S. Cl. X.R.

426—190, 442, 509, 518, 521, 489, 401